(12) United States Patent
Brady et al.

(10) Patent No.: US 7,107,435 B2
(45) Date of Patent: Sep. 12, 2006

(54) SYSTEM AND METHOD FOR USING HARDWARE ASSIST FUNCTIONS TO PROCESS MULTIPLE ARBITRARY SIZED DATA ELEMENTS IN A REGISTER

(75) Inventors: Michael T. Brady, Ithaca, NY (US); Jennifer Q. Trelewicz, Gilroy, CA (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 10/445,563

(22) Filed: May 27, 2003

(65) Prior Publication Data

US 2004/0243789 A1    Dec. 2, 2004

(51) Int. Cl.
*G06F 9/302* (2006.01)
(52) U.S. Cl. .......................................... 712/222; 712/4
(58) Field of Classification Search ...................... None
See application file for complete search history.

(56) References Cited

U.S. PATENT DOCUMENTS

| | | | |
|---|---|---|---|
| 5,875,315 A * | 2/1999 | Narayan | 712/204 |
| 6,223,277 B1 * | 4/2001 | Karguth | 712/224 |
| 2002/0124038 A1 * | 9/2002 | Saitoh et al. | 708/513 |

* cited by examiner

*Primary Examiner*—Kenneth S. Kim
(74) *Attorney, Agent, or Firm*—Dale M. Crockatt; Hoffman, Warnick & D'Alessandro, LLC

(57) ABSTRACT

A system and method for processing multiple arbitrary sized data elements in a register. A method of the invention comprises the steps of: creating a mask register that defines a set of arbitrary sized segments for a register; storing a plurality of arbitrary sized data elements in a segmented data register arranged in accordance with the mask register, wherein the arbitrary sized data elements are sign extended; simultaneously operating on each of the of the data elements in the segmented data register to generate a set of resulting data elements in response to a machine instruction, wherein the resulting data elements depend on each other; and unpacking the resulting data elements to provide a plurality of arbitrary sized results that are independent of each other.

20 Claims, 6 Drawing Sheets

SYSTEM AND METHOD FOR USING HARDWARE ASSIST FUNCTIONS TO PROCESS MULTIPLE ARBITRARY SIZED DATA ELEMENTS IN A REGISTER

BACKGROUND OF THE INVENTION

1. Technical Field

The present invention relates generally to processing multiple data elements in a computer register, and more specifically relates to a system and method for utilizing a mask register and hardware assist instructions to simultaneously process multiple data elements of arbitrary size.

2. Related Art

Computer processors function by processing data elements through various registers in accordance with instructions provided by a computer program. The registers generally have a capacity that is a power of two. For instance, a register might have a capacity of 8 bits, and it would be able to process, in a single processing cycle, a data element having up to eight bits in the element. As an example, an 8-bit register can process a 4-bit data element in a single cycle. Of course, registers typically have sizes larger than 8 bits, i.e., registers can have 16 bit capacities, or 32 bits, or 64 bits, and so on. Non-limiting illustrative examples of the types of operations undertaken by registers include multiplication by a constant, addition, subtraction, shift left-logical, shift right-logical, AND, and OR operations.

After the data elements have been processed, they can be sent to another register for further processing, or they can be stored or output. To illustrate, in the printer field, a server microprocessor processes an input data stream through its various registers in accordance with a computer program, and it might output a data stream of compressed image data in so-called JPEG format to a printer processor, which then operates on the data as appropriate to instruct a printer apparatus how to print the image.

The processor itself executes instructions in the form of machine language, which are the low level instructions relating to what data elements are processed through which registers. Most software however is written in higher-level programming code such as C, which has the advantages of being human readable and of embodying relatively complex processing operations using comparatively short, quickly-written commands. A compiler receives the high-level programming code, decides the best way among many choices to map it into assembly language, passes the mapping to an assembler, and the assembler then maps the assembly language into so-called machine language that is readable by a processor. From time to time, a programmer may elect to write parts of the program that are executed more frequently than other parts directly in a lower-level language. While more cumbersome to write, these so-called "hand-crafted" portions of code do not have to be translated by a high level language compiler and, thus can be written in a more optimized fashion to facilitate faster processing at run time.

Regardless of whether the processor receives the machine code from a compiler or directly from a handcrafted program, the present invention makes the critical observation that it is often the case that register space is wasted. More particularly, as intimated above a register might not be used to its full capacity in every processing cycle. For instance, when a 16-bit capacity register is used to process 4-bit data elements, 12 bits of the register per cycle are wasted. This slows processing time, creates additional data caching requirements (and attendant cache miss problems), and in general fails to fully exploit processor capacity. Accordingly, the present invention recognizes the potential improvement in processor performance that would inure were multiple data elements to be processed in a register in a single cycle.

The present invention further understands that implementing a solution for the above is not trivial, particularly if both positive and negative (that is, "signed") values, and not just positive values, are to be processed, owing to the possibility of exceeding register capacity and/or corrupting data during processing. Stated differently, as used by the present invention, a "signed" data element is one that is not constrained to be non-negative, and it is desirable that multiple signed data elements be processed through a single register in a single processing cycle. Furthermore, the present invention understands that for robustness, it is desirable that a processor not be constrained by the manufacturer to accept multiple data elements per register of only predetermined bit sizes, but rather that a programmer have the flexibility to define arbitrary data element bit sizes that can be accepted by a register as the particular application might happen to dictate.

U.S. patent application Ser. No. 09/675779, filed on Sep. 29, 2000, entitled, SYSTEM AND METHOD FOR ENABLING MULTIPLE SIGNED INDEPENDENT DATA ELEMENTS PER REGISTER, which is hereby incorporated by reference, describes a software solution to address the above problems. This solution allows multiple signed independent data elements to be packed in a register. The register is operated on by standard operations with some additional operations in certain cases. The data is then "unpacked" and returned to its 2's complement form. The term "pack" means that the data is possibly dependent on element(s) to the right of it. The described method has however, various opportunities for enhancement.

First, the pack and unpack processes constitute overhead which, for smaller loop sizes, is in some cases unacceptable. Second, some instructions need additional operations to ensure that the data is not modified. Third, the processor has no mechanism by which multiple error flags or condition codes can be set. For instance, if elements "packed" in a register exceed the precision of the space that they have been allocated, there is no error flag or condition code set. The programmer is responsible for ensuring that the data will not overflow its precision by design.

Accordingly, a need exists for a more robust solution to the problems mentioned above.

SUMMARY OF THE INVENTION

The present invention addresses the above-mentioned problems, as well as others, by providing a system and method for using a mask register and hardware assist functions to simultaneously process multiple data elements of arbitrary size. In a first aspect, the invention provides a method for processing multiple arbitrary sized data elements in a register, comprising: creating a mask register that defines a set of arbitrary sized segments for a register; providing a segmented data register containing a plurality of arbitrary sized data elements arranged in segments in accordance with the mask register; and simultaneously operating on each of the data elements in the segmented data register in response to a machine instruction.

In a second aspect, the invention provides a processing unit having hardware assist functions for operating on multiple signed independent data elements in a single register, the processing unit operating in response to machine instructions comprising: (1) a merge instruction that merges a data value from a source register to a first segmented register capable of holding a plurality of segmented data elements, wherein the segmented data elements are arranged in segments of arbitrary size in accordance with a mask register; (2) a packing instruction that sign extends each of the segmented data elements and stores the results in a second segmented register, wherein the segmented data elements can be operated on simultaneously to provide a resulting set of segmented data elements that are dependent on each other; (3) an unpack instruction that unpacks each of the resulting set of data elements to the first segmented register, such that the resulting set of data elements are independent of each other; and (4) a split instruction that transfers data elements from the first segmented register to a plurality of independent registers.

In a third aspect, the invention provides a method for processing multiple arbitrary sized data elements in a register, comprising: creating a mask register that defines a set of arbitrary sized segments for a register; storing a plurality of arbitrary sized data elements in a segmented data register arranged in accordance with the mask register, wherein the arbitrary sized data elements are sign extended; simultaneously operating on each of the of the data elements in the segmented data register to generate a set of resulting data elements in response to a machine instruction, wherein the resulting data elements depend on each other; and unpacking the resulting data elements to provide a plurality of arbitrary sized results that are independent of each other.

Accordingly, it is an advantage of the present invention to utilize hardware assist functions that can be added to standard arithmetic logic units (ALUs). Namely, the solution embodies special hardware operations to perform functionality such as "pack," "unpack," shift right by n bits, etc., in a single clock cycle, which would otherwise require multiple clock cycles in a standard ALU. The solution may also embody a special error and condition status bits register that the standard ALU core does not need to know anything about. One advantage utilizing standard ALUs is the facilitation of rapid layout of custom hardware (FPGAs, ASICs, etc.) designed using optimized and proven ALU components. The optimized and proven components will have already been verified for functionality, power utilization, speed of operation, space utilization, peak current, etc.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
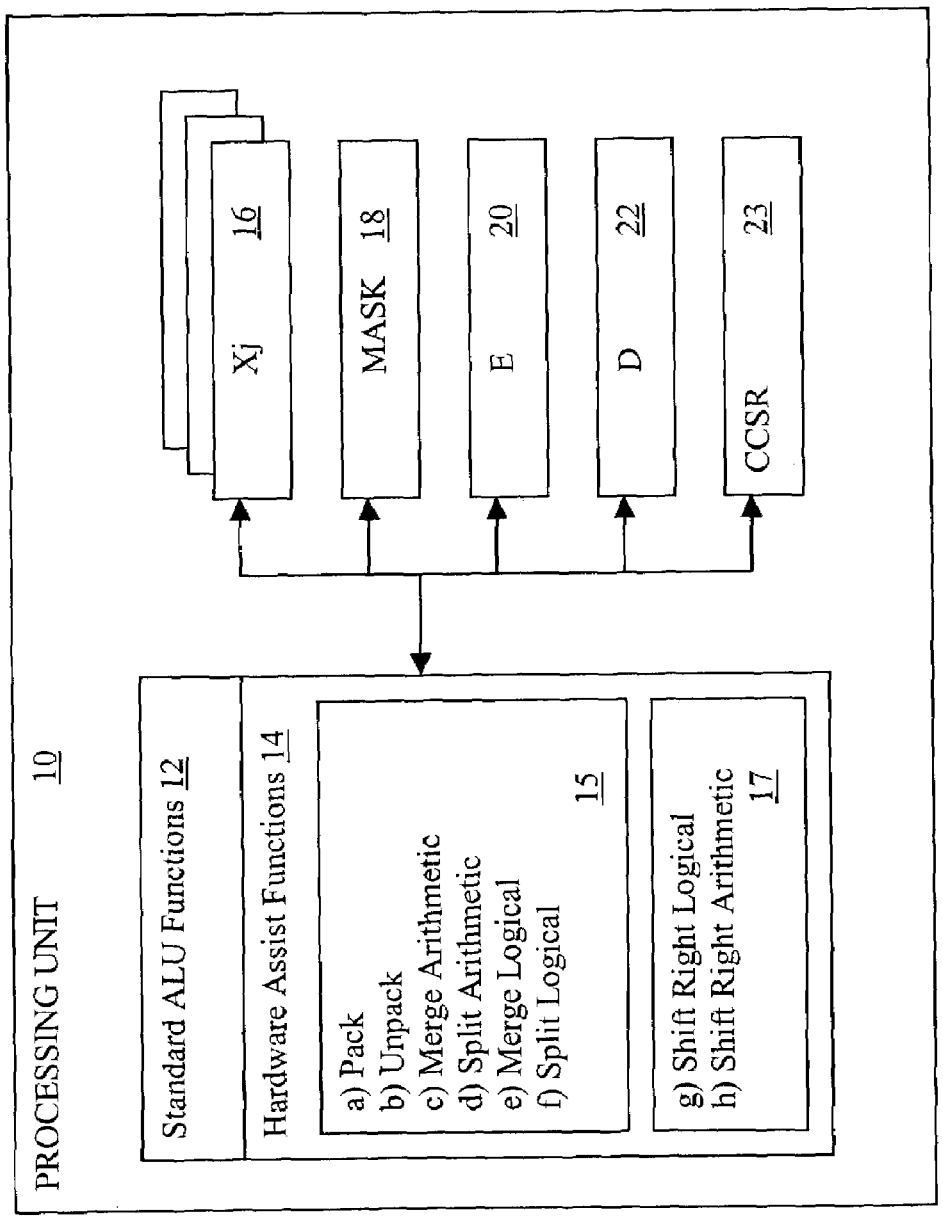
FIG. 1 depicts a processing unit in accordance with an embodiment of the present invention.

Referring now to the drawings, FIG. 1 depicts an exemplary processing unit 10 for implementing the present invention. Processing unit 10 includes a set of standard ALU (arithmetic logic unit) functions 12, such as add, subtract, multiply, OR, XOR, shift left, etc. In addition, processing unit 10 includes a set of hardware assist functions 14 (i.e., machine instructions) that allow multiple data elements of arbitrary size to be processed simultaneously in a register. Exemplary hardware assist functions 14 include a set of core assist functions 15 including: pack, unpack, merge arithmetic, split arithmetic, merge logical, and split logical; and a set of ancillary assist functions 17, including: shift right logical, and shift right arithmetic. Also included in processing unit 10 are source registers Xj 16, each capable of holding independent data values, a mask register 18, a least one first segmented register type E 20 for holding multiple data elements that are independent of each other and not sign extended, and at least one second segmented register type D 22 for holding multiple data elements that are sign extended and may be dependent on each other. Also included is a condition code status register (CCSR) 23 for maintaining test bits for overflows, carries, etc. Each of the above-mentioned registers may be implemented using general purpose registers GPR's, so that the standard ALU core does not need to know about them; i.e., the standard ALU design does not need to be changed to accommodate them. Details regarding the operation of the hardware assist functions 14 and registers 16, 18, 20, 22 and 23 are described below.

Figure 2:
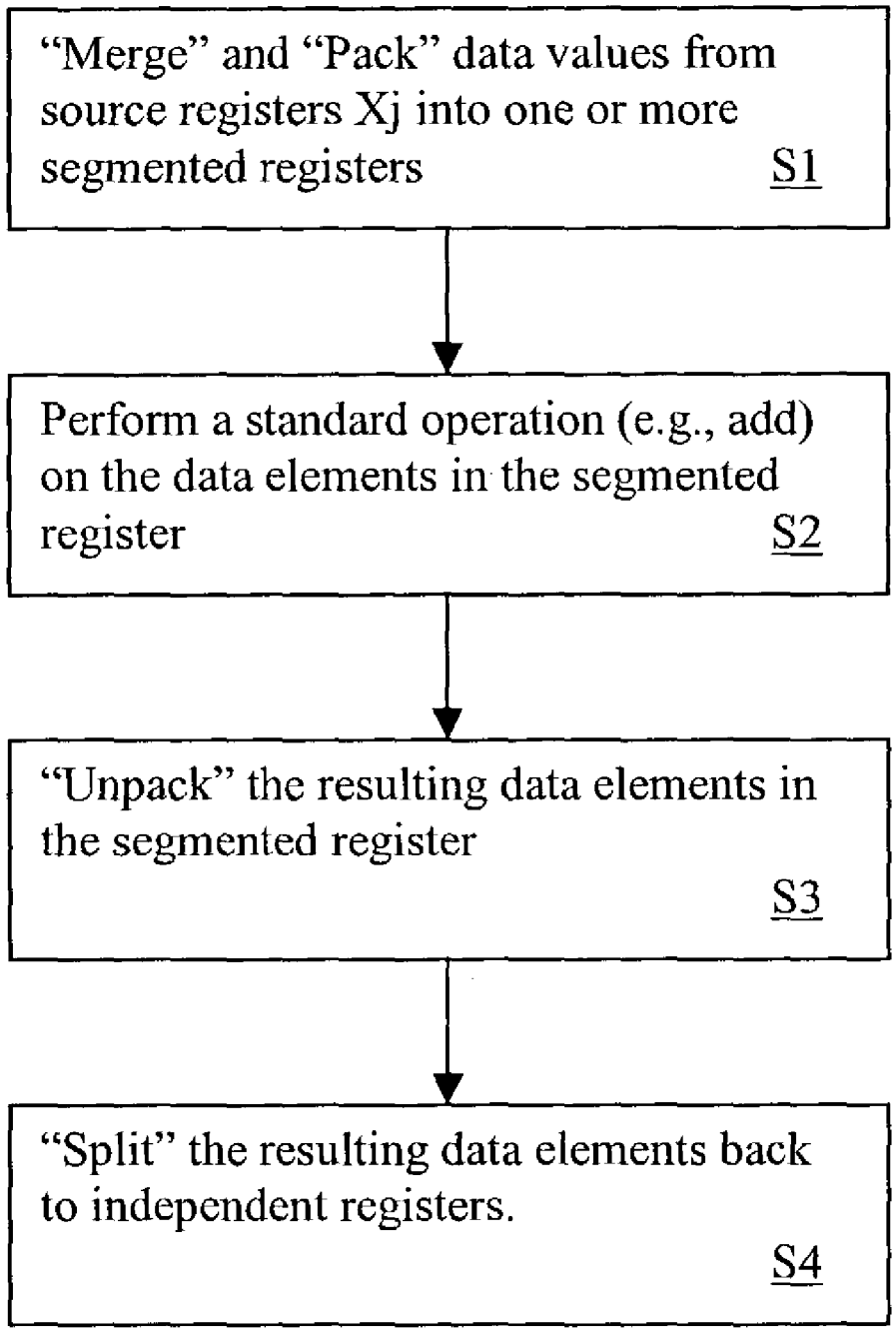
FIG. 2 depicts a flow diagram of an exemplary method of implementing the invention.

Referring now to FIG. 2, a flow diagram is shown depicting an exemplary method for implementing the general concept of the invention. First, in step S1, data values from one or more source registers Xj are merged and packed into one or more segmented registers. In this step, the data values are concatenated (i.e., merged) together and sign extended (i.e., packed), if needed. Then, in step S2, a standard ALU operation (e.g., add) is simultaneously performed on the data elements in the segmented data register(s), with the results being stored in a segmented register. As will be further described below, the resulting data elements may be dependent on each other after the operation, e.g., due to carries, shifts, etc., between segments. Next, the resulting data elements are "unpacked" in step S3 to eliminate any dependencies among the resulting data elements. Finally, in step S4, the resulting data elements can be split back into independent registers.

As an example, assume source registers X1, X2 and X3, contain the following sign extended data values {1, –8, –4}, each of arbitrary precision:

| | |
|---|---|
| X1(1): | 000001 (6 bits) |
| X2(–8): | 11111000 (8 bits) |
| X3(–4): | 1111111100 (10 bits). |

The data values from each source register would then be merged and packed into a single register D1 containing three data elements or segments, as follows:

| | |
|---|---|
| D1: | 000000 11110111 1111111100. |

Assume a second set of source registers X4, X5, X6 containing the sign extended data values {−2, −5, 4} (of similar precision to X1, X2, X3) are packed and merged in register D2, as follows:

| | |
|---|---|
| D2: | 111101 11111011 0000000100. |

Next, a standard ALU operation is performed, in this case an "add" operation, generating the following result in D3:

| | |
|---|---|
| D1: | 000000 11110111 1111111100 |
| + D2: | 111101 11111011 0000000100 |
| D3 | 111110 11110011 0000000000 |

It should be understood that the add operation is being depicted for exemplary purposes only, and that other standard ALU operations, such as subtract, scalar multiplication, etc., could be used. At this point, the resulting data elements d1:111110, d2: 11110011, and d3:0000000000 need to be unpacked to adjust for dependencies introduced by any carries, borrows, etc. This is accomplished by: (1) taking the sign bit of the least significant data element d1 and adding it to the next least significant data element d2, (2) taking the sign bit from d2 and adding it to d3, as follows:

| | |
|---|---|
| (1) | 111110 11110011 000000000 |
| | 0 |
| | 111110 11110011 0000000000 |
| (2) | 111110 11110011 0000000000 |
| | 1 |
| | 111111 11110011 0000000000, | resulting in data elements e1=111111, e2=11110011, e3=0000000000 or {−1, −13, 0}.

The methodology described with reference to FIG. 2 is implemented using the hardware assist instructions and registers described in FIG. 1. These instructions are described below with reference to FIGS. 3–9. For the purposes of explanation, the described instructions will be assumed to be operating in fixed point M-bit general purpose registers (GPR's).

Figure 3:
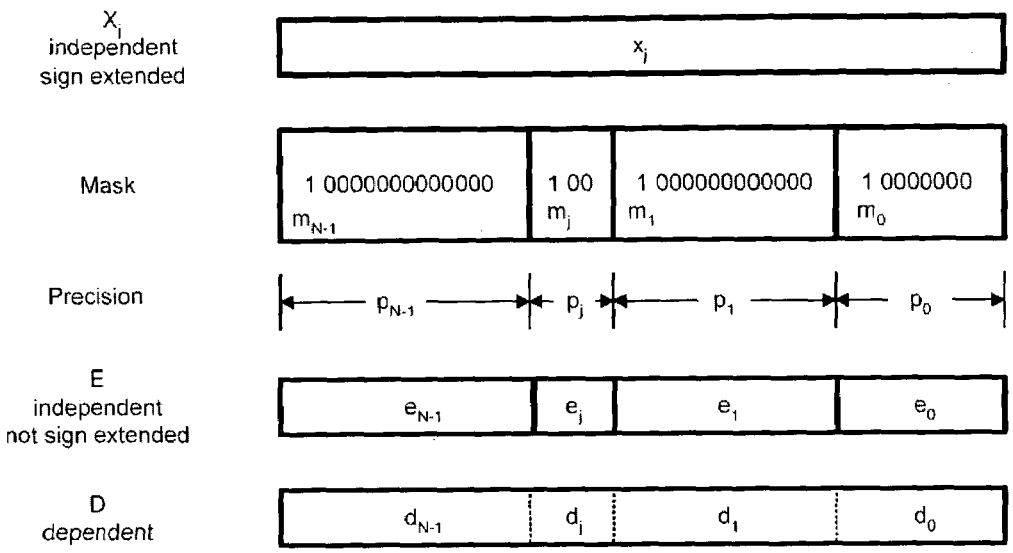
FIG. 3 depicts a register overview in accordance with an embodiment of the present invention.

Initially, a GPR is designated either by the compiler or by the user as a mask register. The mask register is utilized to define a set of arbitrary sized segments for a register, with each segment capable of holding an arbitrary sized data element. Initially, the mask register can be set up to have a default value zero with most significant bit (MSB) set to 1, signifying that there is only one element or segment in the register. Each bit set to a '1' will indicate the left most bit of a segment's precision. The bit to the immediate left of this one will denote the LSB (least significant bit) of the next segment. These 1's delineate between the various segments, thereby defining each segment's precision as shown in FIG. 3. As also shown in FIG. 3, $p_j$ denotes the precision of the jth segment including all sign and guard bits (guard bits are explained in detail in the aforementioned reference SYSTEM AND METHOD FOR ENABLING MULTIPLE SIGNED INDEPENDENT DATA ELEMENTS PER REGISTER), with the total number of segments being N.

The registers Xj represent a plurality of independent source registers, each containing a unique data value, with the jth register being referred to as Xj.

As noted, the mask register defines the arbitrary sized segments for registers that are used to hold and process multiple data elements. In the exemplary embodiment depicted in FIG. 3, two types of segmented registers are implemented, E and D. Register type E comprises a segmented data register for holding multiple data elements $e_0$, $e_1 \ldots e_{N-1}$ that are independent of each other and not signed extended. Register type D comprises a segmented data register for holding multiple data elements $d_0$, $d_1 \ldots d_{N-1}$ that are sign extended and may have dependencies on each other. Depending on the type of operation being implemented, an E and/or D type register may be used.

The definition of independent elements for a register E with elements $e_j$ is given by:

Let q and j be integers on the interval [0, N−1], where element $e_q$ changes.

$$\frac{\text{Change in } e_j}{\text{Change in } e_q} = 0 \text{ for } q \neq j \text{ or } 1 \text{ for } q = j$$

i.e., $e_j$ is exactly the two's compliment representation of the corresponding integer in $p_j$ bits for all j. The definition of dependent elements $d_j$ for a register D is the following, where element $d_q$ changes:

$$\frac{\text{Change in } d_j}{\text{Change in } d_q} = 0 \text{ for } q > j,$$

$d_j$ is the two's complement representation of the corresponding $e_j$ minus 1 or 0, depending upon $d_{j-1}$. Note that it is possible to have a register D with dependent elements that meet the criteria for an independent register. However, all of the elements must be positive and fit into the precision previously determined.

Let $s_j$ be the sign bit (in two's complement notation, the MSB is called here the "sign bit" for convenience) of the $d_j$ where 0 is positive and 1 is negative.

$$d_j = e_j - s_{j-1}.$$

Figure 4:
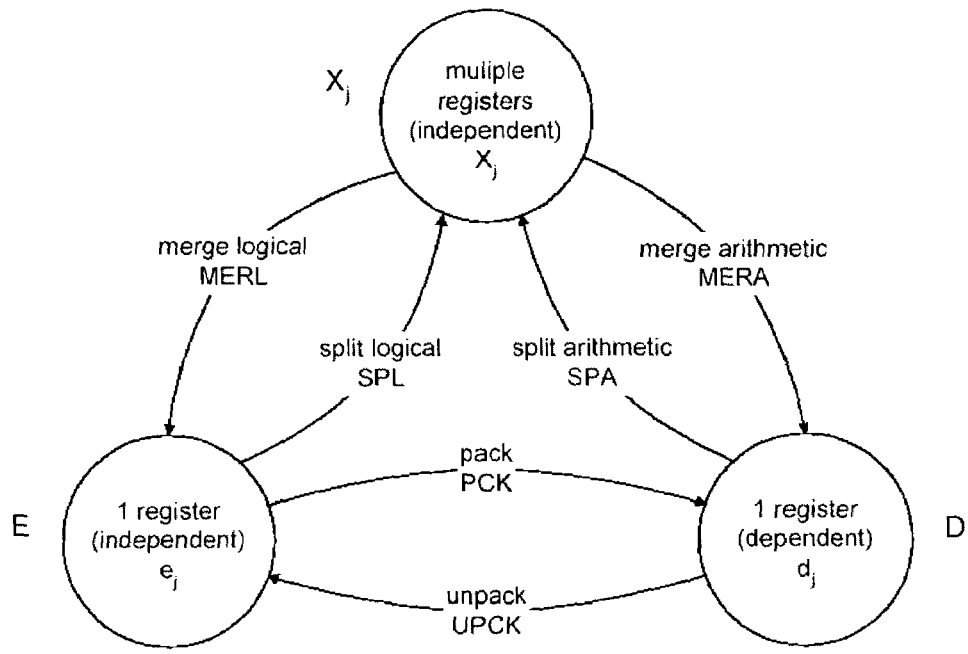
FIG. 4 depicts the logical relationships among the core assist instructions in accordance with an embodiment of the present invention.

FIG. 4 depicts a set of relationships between the six core assist instructions 15, a set of source registers Xj, an E type register, and a D type register. In general, the source registers Xj interact with an E type register using "merge logical" (MERL) and "split logical" (SPL) machine instructions. Source registers Xj interact with a D type register using "merge arithmetic" (MERA) and "split arithmetic" (SPA) machine instructions. Logical instructions MERL and SPL generally deal with operations that involve independent data elements that are not sign extended, while arithmetic instructions MERA and SPA deal with operations that involve dependent data elements that are sign extended. "Pack" (PCK) and "Unpack" (UPCK) machine instructions provide operations for converting back and forth between dependent and independent data elements.

As noted above, a set of hardware assist functions 14 is provided to implement the invention. These functions are described in detail below. Unless otherwise stated, the mask register or "Mask" is a proper mask with the appropriate precision for each element as corresponding to the register being unpacked. U denotes an unknown binary value of either 0 or 1, as opposed to an "X" or "don't care," $s_j$ is the sign bit of the jth element. The sign extension function is given by $\Phi(\ )$. An exemplary instruction syntax for an arbitrary instruction is given by the following, noting that a different standard ALU would potentially change the order of arguments and the precise format:INSTR Mask, Source Register(s), Target Register(s), Miscellaneous Register(s) This is abbreviated by (Source Register(s)→Target Register(s)).

1. Pack (E→D)

Instruction Syntax: PCK Mask, E, D, Tmp

Figure 5:
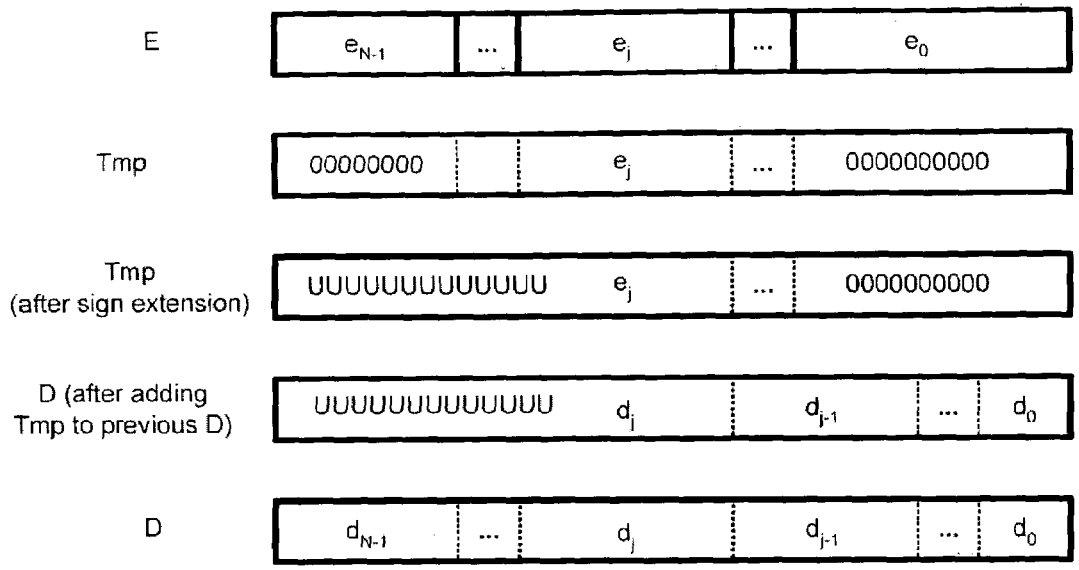
FIG. 5 depicts the register overview for the pack instruction in accordance with an embodiment of the present invention.

D is the target register whose elements depend on each other. E is the source register whose independent elements are to be packed. Tmp is a temporary register. The purpose of Tmp is to sign adjust each element, $e_j$. As noted above, Mask contains the information that defines the precision of each data element in E and D. FIG. 5 depicts a register overview of the pack instruction, which shows the data elements in register E being sign extended and stored in register D. The logic for the instruction is as follows:
D=0
for j=0 to N−1
Tmp=$e_j$
Tmp=$\Phi$(Tmp)
D=D+Tmp
End Note that the recursive solution does not imply that the elements need to be packed in any particular order.

2A. Unpack (D→E)—First Variant

Instruction Syntax: UPCK Mask, D, E

Figure 6:
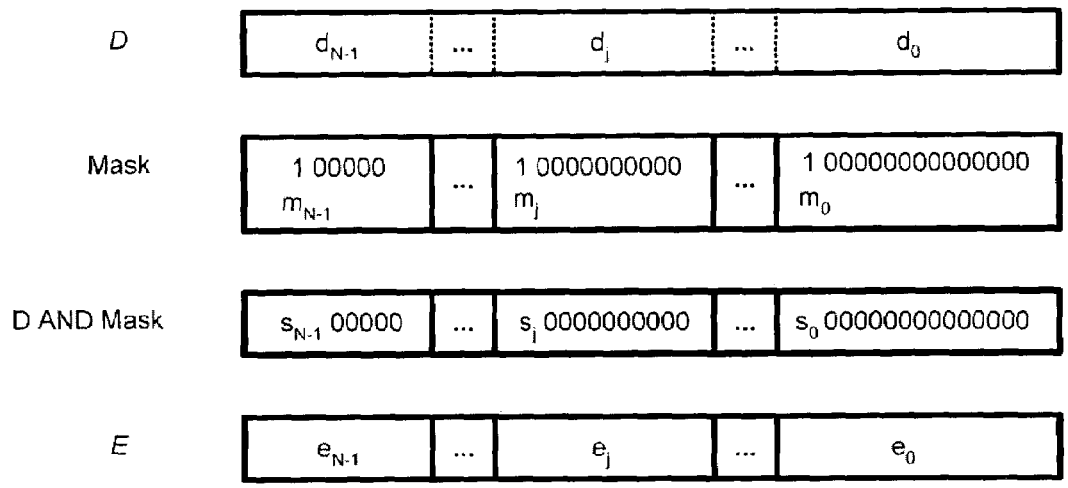
FIG. 6 depicts the register overview for a first variant of the unpack instruction in accordance with an embodiment of the present invention.

D is the source register whose elements depend on each other. E is the target register with unpacked, independent elements. Mask is the register containing the precision information of D. The unpack instruction transforms the $d_j$ into $e_j$. FIG. 6 depicts a register overview of the first variant of the unpack instruction, with sign extended data elements in register D being converted to register E. This may be accomplished by the equation as follows:

$$E=D+(D \text{ AND Mask})(\text{where AND is a logical AND bit by bit operation})$$

$$e_j=d_j+s_{j-1}$$

Note that this method of unpacking assumes that the bit to the right of the sign bit contains the same information as the sign bit just before unpacking.

2B. Unpack (D→E)—Second Variant

Instruction Syntax: UPCK Mask, D, E

D in this case is the source register whose elements depend on each other. E in this case is the target register, with unpacked, independent elements. The sign bit of each element is added to the least significant bit of the element to the left. This is done from right to left allowing the sign bit to "ripple" through the rest of the elements before the process is repeated. Let $m_j$ represent a register filled with all 0's except the '1' bit that is in the sign bit position for the jth element. More precisely it is meant that $m_j=2^{\wedge}(p_0+p_1+ \ldots +p_j)-1$. The following pseudo code describes how to "unpack" a register saving the sign bit in each element.
E=D
for j=0 to N−1
E=(($m_j$ AND E)<<1 )+E
End Note the trade-off between unpacking instructions 2A and 2B. Instruction 2A is the fastest, but also requires an additional guard bit for each element. Instruction 2B requires more complexity, however, it does not require an "extra" guard bit. Note that is is not necessarily slower—i.e., the process could be parallelized or pipelined, etc., but it is more complex.

3. Merge Arithmetic (Xj→D)

Instruction Syntax: MERA Mask, Xj, D

Figure 7:
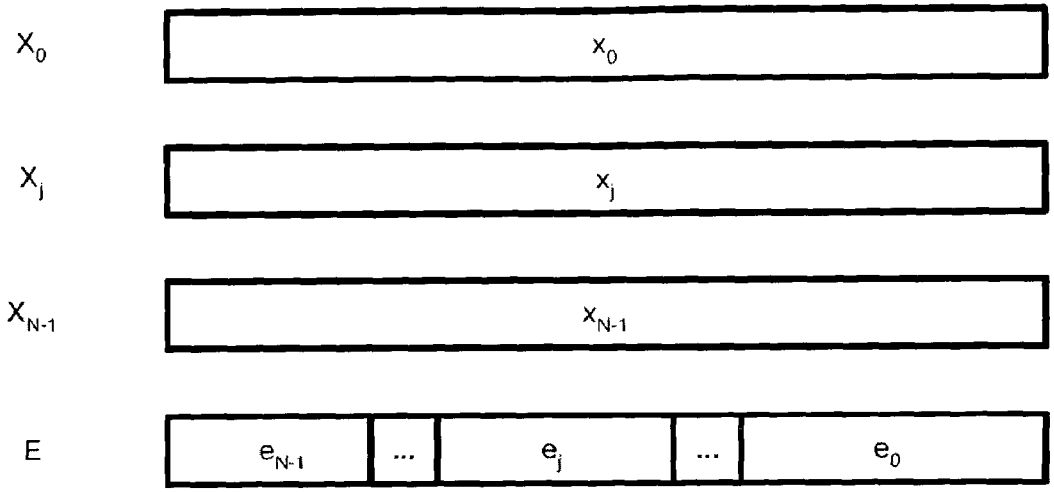
FIG. 7 depicts the register overview for the merge arithmetic instruction in accordance with an embodiment of the present invention.

Xj in this case are the source register(s) whose elements are independent. D in this case is the target register whose elements depend on each other. FIG. 7 depicts a register overview of the merge arithmetic instruction. The implementation equation is as follows:

$$E=X_0+\Sigma_j(Xj<<p_0+ \ldots +p_{j-1})$$

4. Split Arithmetic (D→Xj)

Instruction Syntax: SPA Mask, D, Xj, Tmp

D in this case is the source register whose elements depend on each other. Xj in this case are the target register(s) whose elements are independent. Tmp in this case is a temporary register whose elements are independent. The split arithmetic instruction is inherently a two-step process given by the following:
D→E
E→Xj The first step can easily be accomplished by the UPCK command. The second step can then be accomplished by the SPL command, as shown in FIG. 4.
UPCK Mask, D, Tmp
SPL Mask, Tmp, Xj 5. Merge Logical (Xj→E)

Instruction Syntax: MERL Mask, Xj, E

Figure 8:
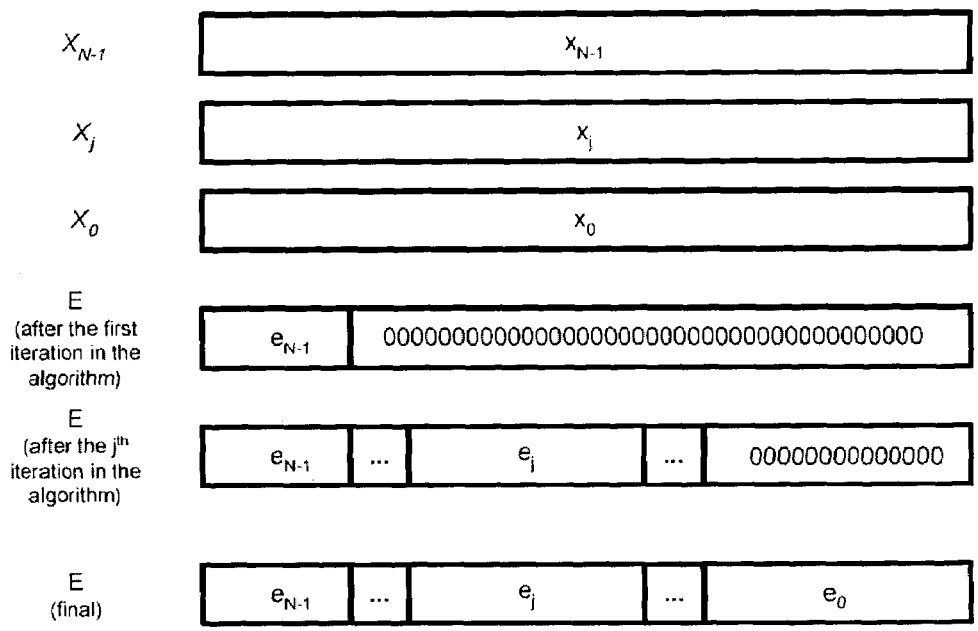
FIG. 8 depicts the register overview for the merge logical instruction in accordance with an embodiment of the present invention.

Xj in this case are the source register(s) whose elements are independent. E in this case is the target register whose elements are independent. A register overview of the merge logical instruction is shown in FIG. 8. The logic for implementing this instruction is as follows:

```
for (j >= 1), let Pj = p_0 + ... + p_{j-1}
    E = 0
for j = N-1 to 1
    E = E (OR ( Xj AND (2 ^ (P_j-1) - 1 )) << P_{j-1})
    end
E = E OR (X0 AND ( 2 ^ (p_0-1) - 1 ))
```

Note that the $2^{\wedge}(p_{j-1})-1$ term used for the AND operation simply picks off the bottom $p_j$ bits of Xj.

6. Split Logical (E→Xj)

Instruction Syntax: SPL Mask, E, Xj

Figure 9:
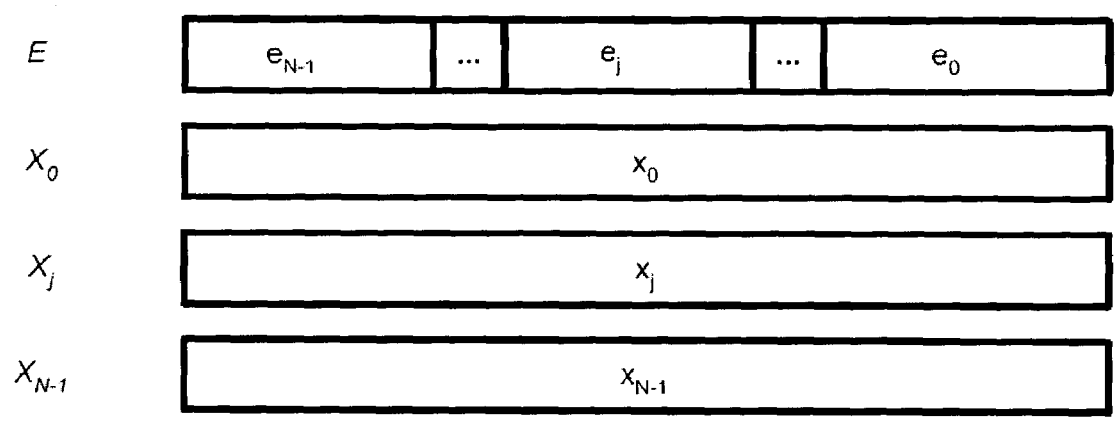
FIG. 9 depicts the register overview for the split logical instruction in accordance with an embodiment of the present invention.

E in this case is the source register whose elements are independent. Xj in this case are the target register(s) whose elements are independent. A register overview of the split logical instruction is shown in FIG. 9. The logic for implementing is as follows:

X0=e0
X1=e1>>p0
Xj=ej>>(p0+ . . . +pj−1) for N−1≧j≧2

The six instructions described above are an exemplary set of core assist instructions 15 that allow the basic principles of the invention to be implemented. Use of these core assist instructions 15 allow certain core ALU operations to be implemented "for free" with no further manipulation. Examples include addition; subtraction; multiplication by a scalar value; shift left logical/arithmetic; bit-wise AND, OR, and XOR; and test for equality. Other operations may require special processing to handle the packed nature of the data, either via software or hardware. In these cases, ancillary machine instructions 17 may be provided. For instance, shift right logical and shift right arithmetic, described below are two examples of operations that can be implemented to operate on a segmented register using the logic described below.

7. Shift Right Logical

Instruction Syntax: SRL Mask, E, Shift

E is the source register with independent elements. "Shift" is the shift amount.

The logic is as follows:
for i=1 to Shift
E=E>>1
E=E AND~Mask
End

8. Shift Right Arithmetic

Instruction Syntax: SRA Mask, D, Shift

D is the source register with independent elements. Shift is the shift amount. The following functional description shows the sign extension required for SRA:
for i=1 to Shift
Tmp=D AND Mask
D=D>>1
D=(D AND~Mask) OR Tmp
End It is noted that in addition to processing data, the invention may be required to handle flags for different purposes. The standard condition register present in a typical ALU is only capable of tracking one of each status bit for the entire register. This does not provide important information relevant to conditions such as element-by-element overflow on pack, sign, zero, etc. Accordingly, a separate test register can be implemented to track status bits for each segment.

Status bits associated with element sign and zero equality can be implemented after each operation simply by testing each element. Specifically,
Sign=Mask AND E
$Zero_j=(e_j==0)$ Overflow on pack (as differentiated from carry out) can be detected by testing each element as it is packed, as follows:
D=0
for j=0 to N−1
Tmp=ej
Tmp=Φ(Tmp)
D=D+Tmp
$Overflow_j=\zeta(Tmp)$
End Where $\zeta(Tmp)=1$ if there are ones and zeros in the bits to the left of $d_j$, since the presence of only ones or zeros indicates sign extension. On the other hand, other condition bits such as carry out of any one element requires additional logic if the carry is to be determined.

Given a condition code status register (CCSR) (which can be implemented in a standard GPR) for the packed register format, additional instructions can be added to the ALU such as a comparison (e.g., "TEST") that sets the separate status bits independently for each element depending on its relation to the comparison value.

It is understood that while the general principles of the invention are implemented in hardware, certain features of the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for processing multiple arbitrary sized data elements in a register, comprising:
   creating a mask register that defines a set of arbitrary sized segments for a register;
   providing a segmented data register containing a plurality of arbitrary sized data elements arranged in segments in accordance with the mask register; and
   simultaneously operating on each of the of the data elements in the segmented data register in response to a machine instruction.

2. The method of claim 1, wherein the step of providing the segmented data register containing a plurality of arbitrary sized data elements includes the steps of:
   providing a plurality of independent source registers, each containing an independent data value;

providing a merge machine instruction for merging independent data values into the segmented data register; and executing the merge machine instruction to merge independent data values into the segmented data register.

3. The method of claim 2, wherein the merge machine instruction causes the plurality of arbitrary sized data elements in the segmented data register to be independent of each other and not sign extended.

4. The method of claim 2, wherein the merge machine instruction causes the plurality of arbitrary sized data elements in the data register to be sign extended.

5. The method of claim 1, wherein the step of simultaneously operating on the segmented data register comprises an operation selected from the group consisting of addition, subtraction, scalar multiplication, shift left, AND, OR and XOR.

6. The method of claim 1, wherein the mask register includes a value of 1 at the left-most bit and 0's for the remaining bits for each segment defined by the mask register.

7. The method of claim 1, comprising the further step of splitting the data elements in the segmented data register into a plurality of independently stored data elements in accordance with the mask register.

8. A processing unit having hardware assist functions for operating on multiple signed independent data elements in a single register, the processing unit operating in response to machine instructions comprising:

a merge instruction that merges a data value from a source register to a first segmented register capable of holding a plurality of segmented data elements, wherein the segmented data elements are arranged in segments of arbitrary size in accordance with a mask register;

a packing instruction that sign extends each of the segmented data elements and stores the results in a second segmented register, wherein the segmented data elements can be operated on simultaneously to provide a resulting set of segmented data elements that are dependent on each other;

an unpack instruction that unpacks each of the resulting set of data elements to the first segmented register, such that the resulting set of data elements are independent of each other; and a split instruction that transfers data elements from the first segmented register to a plurality of independent registers.

9. The processing unit of claim 8, further comprising:
a merge arithmetic instruction that performs the functions of both the merge instruction and packing instruction; and
a split arithmetic instruction that performs the functions of both the unpack instruction and split instruction.

10. The processing unit of claim 8, further comprising:
a shift right logical instruction; and
a shift right arithmetic instruction.

11. The processing unit of claim 8, further comprising a test instruction for testing bits in each of the segments of a segmented register.

12. The processing unit of claim 11, wherein the test instruction tests for an overflow.

13. The processing unit of claim 11, wherein the test instruction tests for a carry.

14. A method for processing multiple arbitrary sized data elements in a register, comprising:

creating a mask register that defines a set of arbitrary sized segments for a register;

storing a plurality of arbitrary sized data elements in a segmented data register arranged in accordance with the mask register, wherein the arbitrary sized data elements are sign extended;

simultaneously operating on each of the of the data elements in the segmented data register to generate a set of resulting data elements in response to a machine instruction, wherein the resulting data elements depend on each other; and unpacking the resulting data elements to provide a plurality of arbitrary sized results that are independent of each other.

15. The method of claim 14, wherein the step of creating the mask register includes the steps of:
configuring a general purpose register with a 1 at the leftmost bit of each segment and 0's for the remaining bits in each segment.

16. The method of claim 14, wherein the step of unpacking the resulting data elements includes the steps of:
adding the sign bit from a first data element to the least significant bit of an adjacent second data element; and
adding the sign bit from the second data element to the least significant bit of an adjacent third data element.

17. The method of claim 16, comprising the further step of: adding sign bits from the third data element to the least significant bit of an adjacent fourth data element.

18. The method of claim 14, wherein the step of storing the plurality of arbitrary sized data elements in the segmented data register, includes the steps of:
providing a plurality of source registers, each containing an independent data value; and
merging each independent data value into the segmented data register in response to the execution of a merge instruction.

19. The method of claim 14, wherein the step of simultaneously operating on each of the of the data elements in the segmented data register includes the step of executing a machine instruction selected from the group consisting of: addition; subtraction; multiplication by a scalar value; shift left logical; shift left arithmetic; bit-wise AND, OR, and XOR; and test for equality.

20. The method of claim 14, comprising the further step of splitting the resulting data elements into a plurality of independent registers in response to the execution of a split instruction.

* * * * *